(12) United States Patent
Ying et al.

(10) Patent No.: US 11,997,620 B2
(45) Date of Patent: May 28, 2024

(54) OFF-RASTER SSB DESIGN IN IAB NETWORKS

(71) Applicant: Apple Inc., Cupertino, CA (US)

(72) Inventors: Dawei Ying, Hillsboro, OR (US); Geng Wu, Portland, OR (US); Lili Wei, Portland, OR (US); Qian Li, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 497 days.

(21) Appl. No.: 17/283,869

(22) PCT Filed: Oct. 29, 2019

(86) PCT No.: PCT/US2019/058533
§ 371 (c)(1),
(2) Date: Apr. 8, 2021

(87) PCT Pub. No.: WO2020/092348
PCT Pub. Date: May 7, 2020

(65) Prior Publication Data
US 2021/0360550 A1   Nov. 18, 2021

Related U.S. Application Data

(60) Provisional application No. 62/753,640, filed on Oct. 31, 2018.

(51) Int. Cl.
*H04W 56/00* (2009.01)
*H04W 24/10* (2009.01)

(52) U.S. Cl.
CPC ......... *H04W 56/001* (2013.01); *H04W 24/10* (2013.01)

(58) Field of Classification Search
CPC ... H04W 24/02; H04W 24/10; H04W 56/001; H04W 56/0015; H04W 56/0025
See application file for complete search history.

(56) References Cited

U.S. PATENT DOCUMENTS

2021/0243794 A1* 8/2021 Li .................. H04L 5/0048

FOREIGN PATENT DOCUMENTS

WO     2017210312 A1    12/2017

OTHER PUBLICATIONS

Qualcomm Incorporated, "Inter-IAB-Node Discovery", 3GPP TSG RAN WG1, Meeting #93, R1-1807395, May 2018, Busan, Korea, 8 pgs.

(Continued)

*Primary Examiner* — Zhensheng Zhang
(74) *Attorney, Agent, or Firm* — Kowert, Hood, Munyon, Rankin & Goetzel, P.C.

(57) ABSTRACT

An apparatus of an Integrated Access and Backhaul (IAB) node includes processing circuitry coupled to a memory. To configure the IAB node for inter-IAB node discovery and measurements within an IAB network, the processing circuitry is to encode a first synchronization signal block (SSB-A) for transmission to an access UE using a first frequency resource from a synchronization raster set of frequency resources. A second SSB (SSB-B) is encoded for transmission to a second IAB node using a second frequency resource from an off-raster set of frequency resources. The off-raster set is non-overlapping with the synchronization raster set of frequency resources and the SSB-B being time-division multiplexed with the SSB-A. A measurement report from the second IAB node is decoded. The measurement report is based on the SSB-B and associated with a backhaul link between the IAB node and the second IAB node.

20 Claims, 8 Drawing Sheets

(56) References Cited

OTHER PUBLICATIONS

AT&T, "Summary of 7.2.3.1 Enhancements to Support NR Backhaul Links", 3GPP TSG RAN WG1, Meeting #94, R1-1809941, Aug. 2018, Gothenburg, Sweden, 18 pgs.
LG Electronics, "Discussions on Discovery Among NR IAB Nodes", 3GPP TSG RAN WG1, Meeting #94, R1-1808513, Aug. 2018, Gothenburg, Sweden, 7 pgs.
Nokia, et al., "Measurements for IAB", 3GPP TSG-RAN WG2, Meeting #101bis, R2-1807723, May 2018, Busan, South Korea, 5 pgs.
International Search Report and Written Opinion for International Application No. PCT/US2019/058533, dated Feb. 21, 2020, 9 pgs.

* cited by examiner

OFF-RASTER SSB DESIGN IN IAB NETWORKS

PRIORITY CLAIM

This application is a U.S. National Stage filing of International Application No. PCT/US2019/058533, filed Oct. 29, 2019, which claims the benefit of and priority to the U.S. Provisional Application No. 62/753,640, filed Oct. 31, 2018. All of the aforementioned applications are incorporated herein by reference in their entireties.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for off-raster synchronization signal block (SSB) design in integrated access and backhaul (IAB) networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for off-raster SSB design in IAB networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
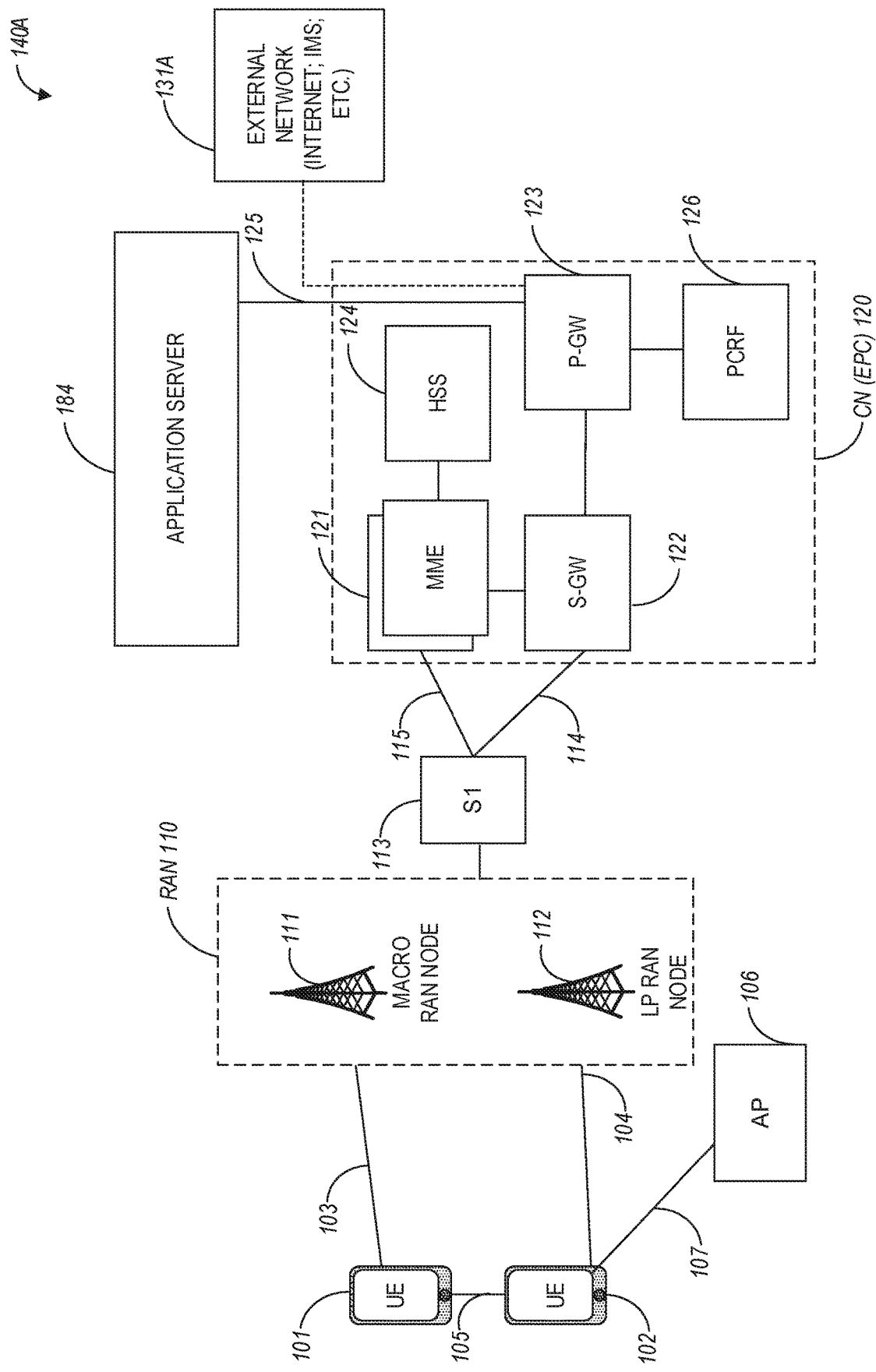
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
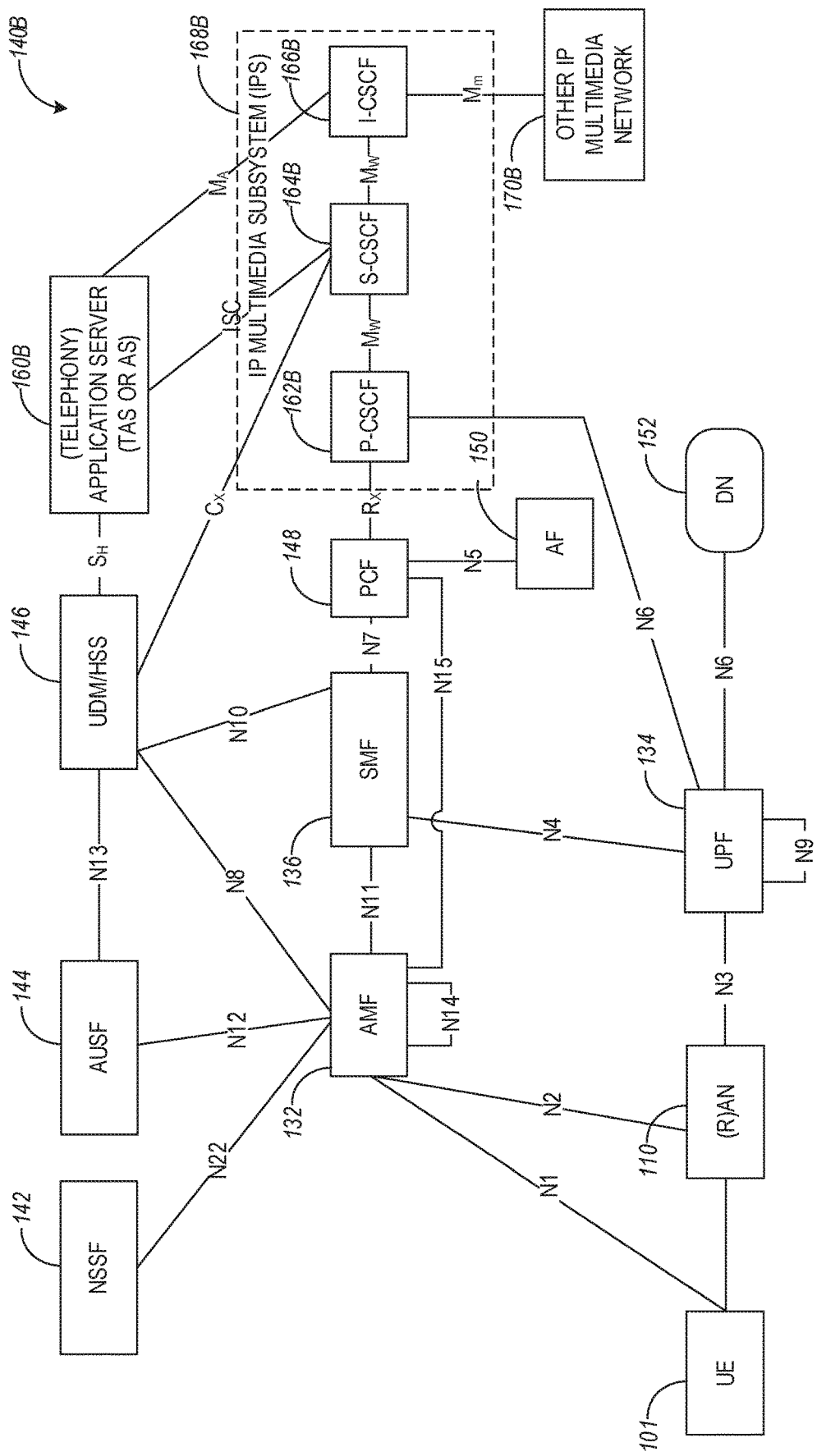
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
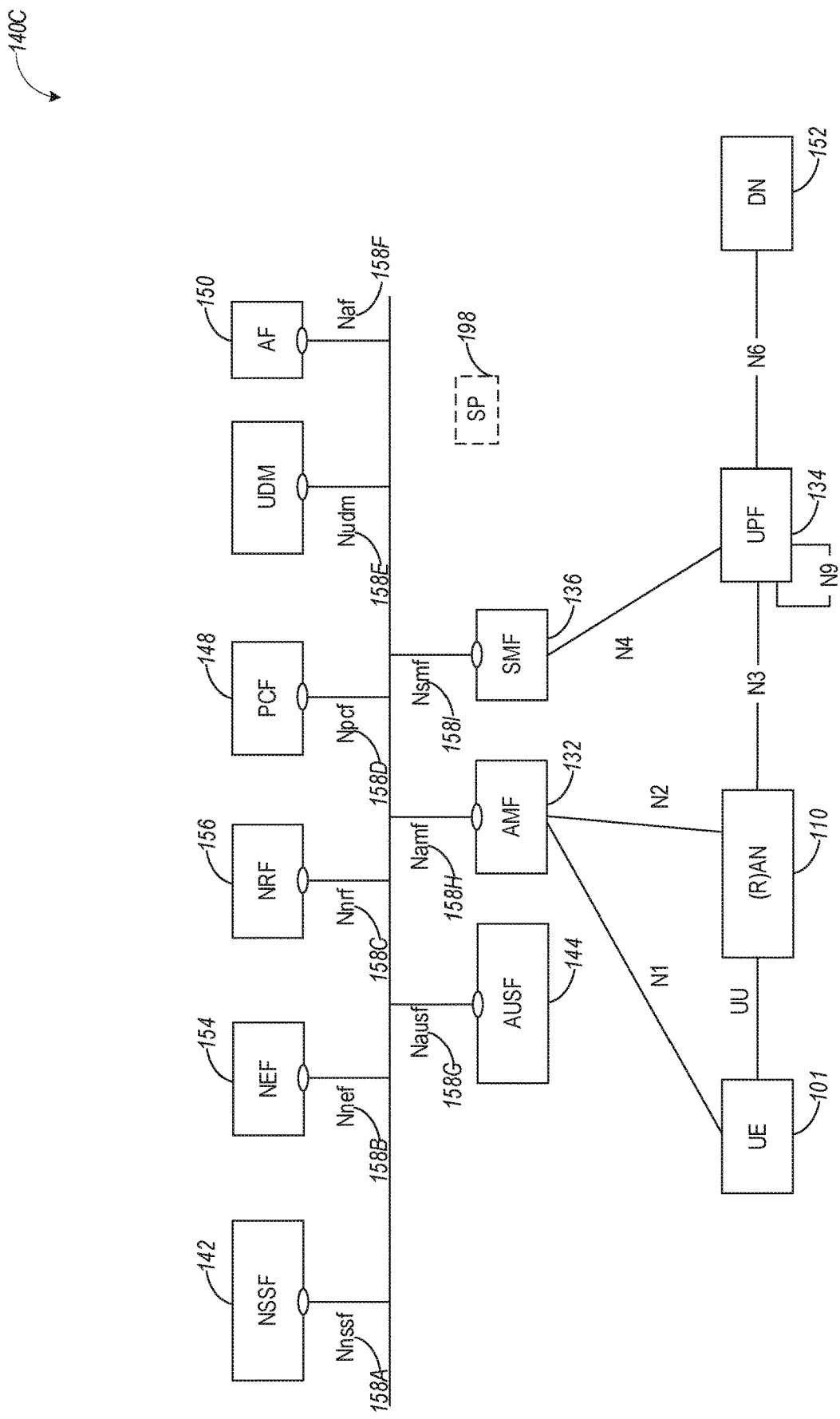

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE, a base station (e.g., any of the UEs or base stations discussed in connection with FIG. 1A-FIG. 1C), or any of the nodes in the Integrated Access and Backhaul (IAB) communication systems discussed in connection with FIGS. 2-5.

For an IAB network, in order for cell detection and measurement to take place, the IAB-donor or an IAB-node may transmit its own synchronization signal block (SSB) to an access UEs or other IAB-nodes (which may be performing initial access and cell discovery). In some embodiments, an IAB node can transmit two sets of SSBs, one SSB (e.g., SSB-A) for access UEs and another SSB (e.g., SSB-B) for other JAB nodes/backhaul links (e.g., nodes already connected in the IAB network that may need to perform inter-IAB node discovery and measurement). For standalone (SA) scenario, the SSB (i.e., SSB-B) for inter-IAB cell search and measurement will be on an off-raster frequency set other than a synchronization raster frequency set used for SSB-A. Since current standards do not accommodate off-raster SSB, techniques disclosed herein can be used for a new design for off-raster SSB transmission/reception. More specifically, techniques disclosed herein can be used in connection with different aspects of off-raster SSB design, including increase periodicity, increase maximum number of candidate SSBs, SSB measurement tab configuration (SMTC) enhancements, and signaling enhancement for off-raster SSB.

Figure 2:
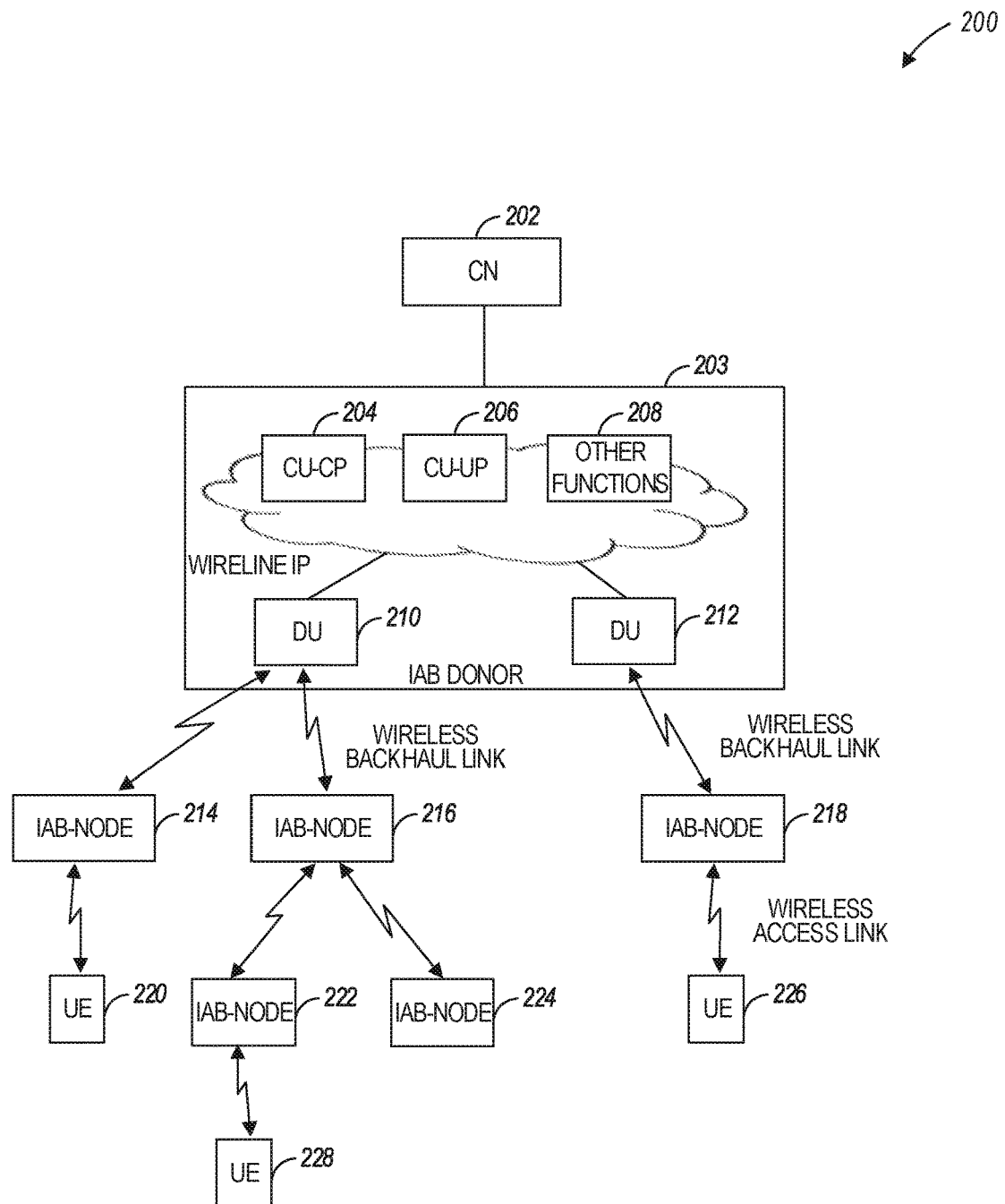
FIG. 2 illustrates a reference diagram of an IAB architecture, in accordance with some aspects.
Figure 3:
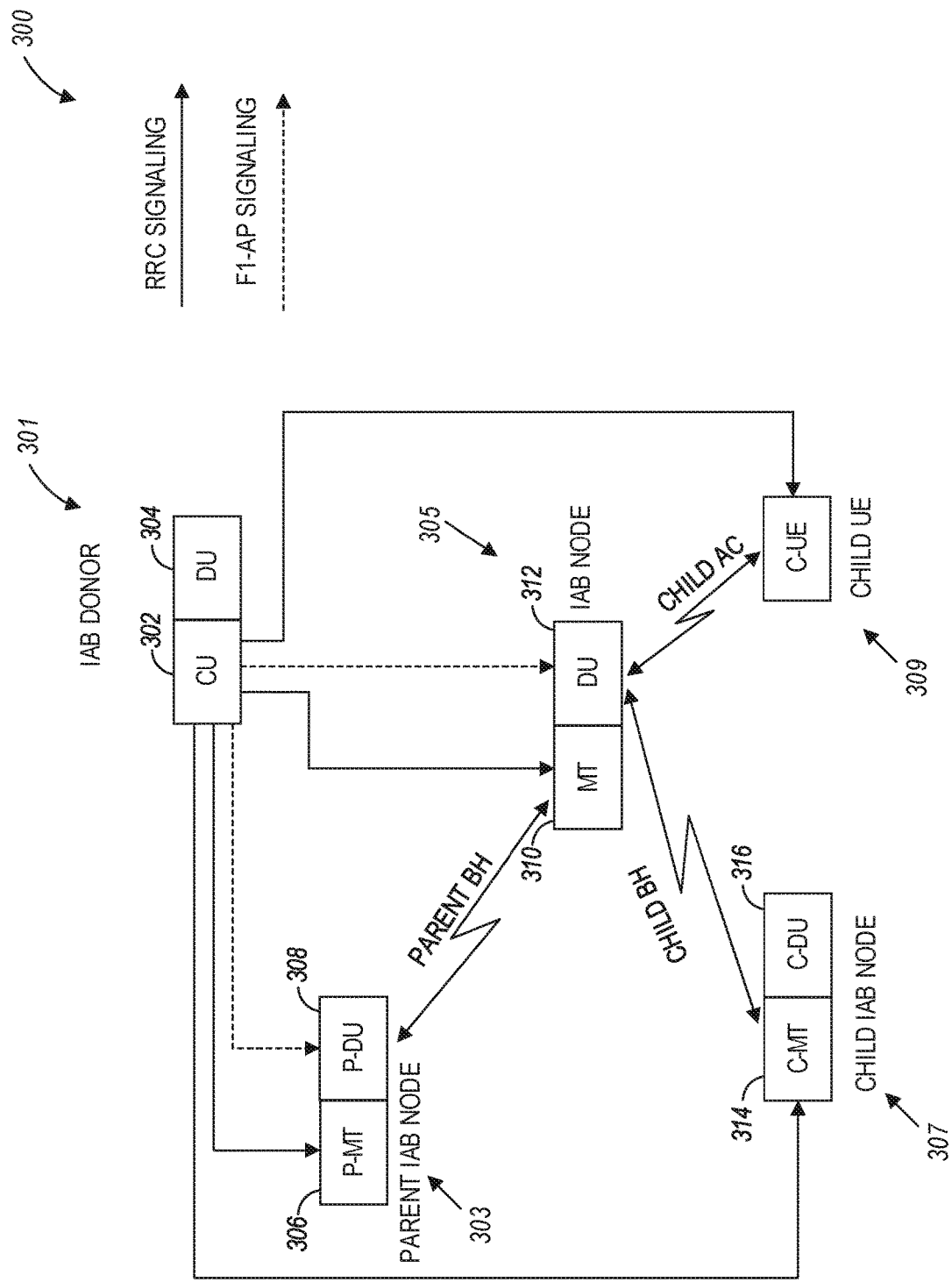
FIG. 3 illustrates a central unit (CU)—distributed unit (DU) split and signaling in an IAB architecture, in accordance with some aspects.

As illustrated in FIGS. 2-3, in an JAB network, an IAB node can connect to its parent node (an IAB donor or another IAB node) through a parent backhaul (BH) link, connect to a child user equipment (UE) through a child access (AC) link, and connect to a child TAB node through a child BH link.

In order for cell detection and measurement to take place, the IAB donor or an IAB node may transmit its own SSB for access UEs or other IAB nodes. From the perspective of a given IAB node, due to the half-duplex constraint, the IAB node may not transmit its own SSB and receive SSBs from other nodes at the same time.

In some aspects, for the purpose of inter-IAB node and donor detection after the TAB node's distributed unit (DU) becomes active (Stage 2), use of SSBs, which are orthogonal with SSBs used for access UEs (which is also called Solution 1B), may be supported. For Solution 1B, the following techniques may be used: (a) For a stand-alone (SA) architecture, SSB for inter-IAB cell search and measurement in Stage 2 is not on the currently defined sync raster; (b) SSB may get muted for inter-IAB cell search and measurement in stage 2; and (c) Since an IAB node should not mute SSB transmission targeting UE cell search and measurement when doing inter-IAB cell search in stage 2, SSB for inter-IAB search is at least TDM with SSB used for UE cell search and measurements.

Figure 4:
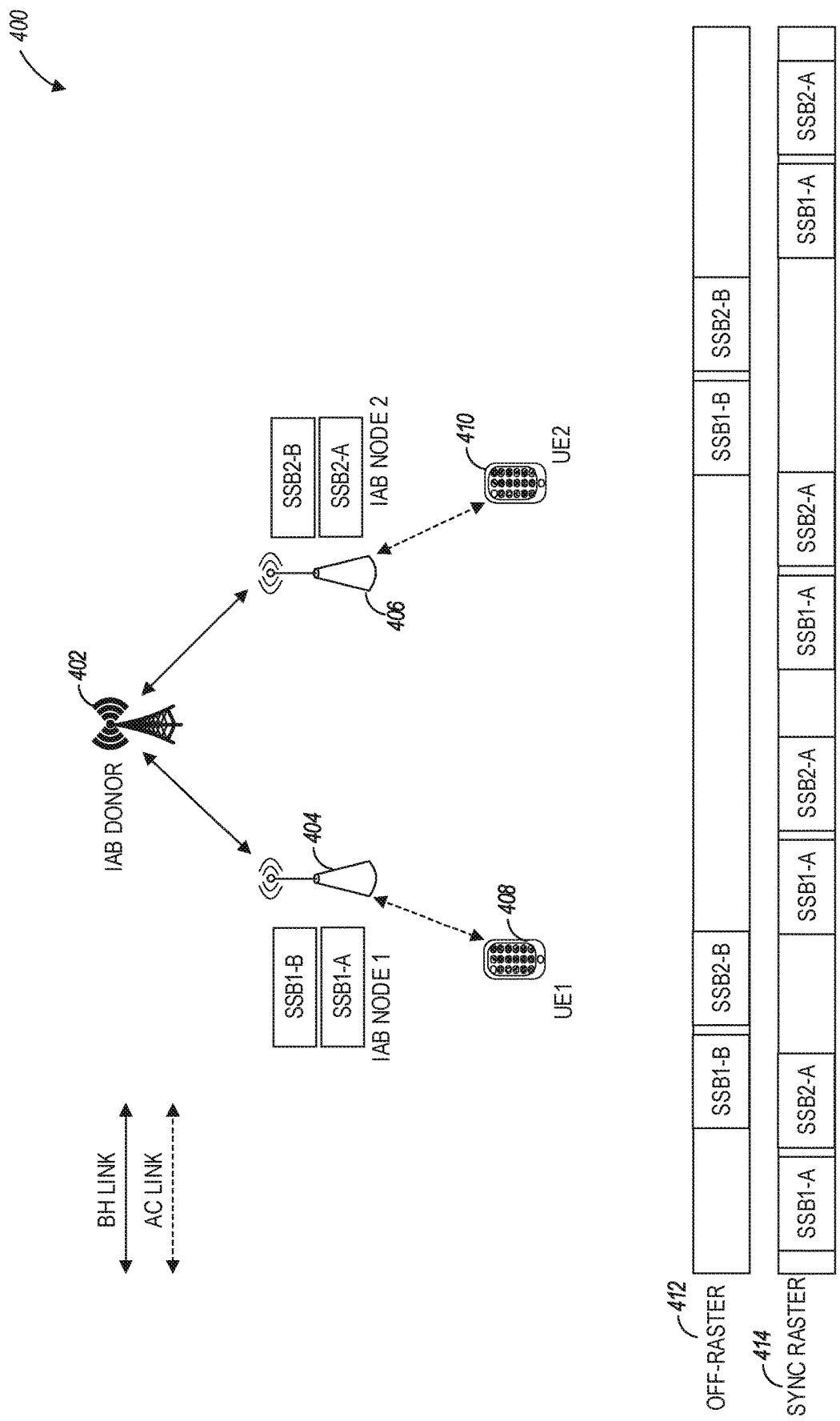
FIG. 4 illustrates SSB transmissions using off-raster and synchronization raster set of frequencies, in accordance with some aspects.

In some aspects, in Solution 1B, an IAB node may transmit two sets of SSBs, one for access UEs (we denote it as SSB-A), and another for other IAB nodes/backhaul links (we denote it as SSB-B). For a SA scenario, SSB-B for inter-IAB cell search and measurement will be on an off-raster set of frequencies. SSB-A and SSB-B from the same IAB node may not only be frequency-division multiplexed (FDM) (e.g., on a synchronization raster and on an off-raster set of frequencies), but may also be time-division multiplexed (TDM) with each other, as illustrated in FIG. 4.

FIG. 2 illustrates a reference diagram of an IAB architecture, in accordance with some aspects. Referring to FIG. 2, the IAB architecture 200 can include a core network (CN) 202 coupled to an IAB donor node 203. The JAB donor node 203 can include control unit control plane (CU-CP) function 204, control unit user plane (CU-UP) function 206, other functions 208, and distributed unit (DU) functions 210 and 212. The DU function 210 can be coupled via wireless backhaul links to IAB nodes 214 and 216. The DU function 212 is coupled via a wireless backhaul link to IAB node 218. IAB node 214 is coupled to a UE 220 via a wireless access link, and IAB node 216 is coupled to IAB nodes 222 and 224. The IAB node 222 is coupled to UE 228 via a wireless access link. The IAB node 218 is coupled to UE 226 via a wireless access link.

Each of the IAB nodes illustrated in FIG. 2 can include a mobile termination (MT) function and a DU function. The MT function can be defined as a component of the mobile equipment and can be referred to as a function residing on an IAB-node that terminates the radio interface layers of the backhaul Uu interface toward the IAB-donor or other IAB-nodes.

FIG. 2 shows a reference diagram for IAB in a standalone mode, which contains one IAB donor 203 and multiple TAB nodes (e.g., 214, 216, 218, 222, and 224). The TAB donor 203 is treated as a single logical node that comprises a set of functions such as gNB-DU, gNB-CU-CP 204, gNB-CU-UP 206, and potentially other functions 208. In deployment, the TAB donor 203 can be split according to these functions, which can all be either collocated or non-collocated as allowed by 3GPP NG-RAN architecture. IAB-related aspects may arise when such a split is exercised. In some aspects, some of the functions presently associated with the IAB-donor may eventually be moved outside of the donor in case it becomes evident that they do not perform IAB-specific tasks.

FIG. 3 illustrates a central unit (CU)-distributed unit (DU) split and signaling in an JAB architecture 300, in accordance with some aspects. Referring to FIG. 3, the JAB architecture 300 includes an JAB donor 301, a parent JAB node 303, an IAB node 305, a child IAB node 307 and a child UE 309. The IAB donor 301 includes a CU function 302 and a DU function 304. The parent JAB node 303 includes a parent MT (P-MT) function 306 and a parent DU (P-DU) function 308. The IAB node 305 includes an MT function 310 and a DU function 312. The child IAB node 307 includes a child MT (C-MT) function 314 and a child DU (C-DU) function 316.

As illustrated in FIG. 3, RRC signaling can be used for communication between the CU function 302 of the IAB donor 301 and the MT functions 306, 310, and 314, as well as between the CU function 302 and the child UE (C-UE) 309. Additionally, F1 access protocol (F1-AP) signaling can be used for communication between the CU function 302 of the IAB donor 301 and the DU functions of the parent IAB node 303 and the IAB node 305.

FIG. 4 illustrates SSB transmissions 400 using off-raster and synchronization raster sets of frequencies, in accordance with some aspects. Referring to FIG. 4, and IAB donor 402 may be connected via backhaul links to IAB nodes 404 and 406. IAB nodes 404 and 406 may be coupled to corresponding access UEs 408 and 410 via AC links. Both IAB nodes 404 and 406 as well as the IAB donor 402 may be transmitting SSB-A signals on the synchronization raster set of frequencies 414 (or sync raster) and SSB-B on the off-raster set of frequencies 412 (or off-raster).

In the example illustrated in FIG. 4, IAB node 404 transmits SSB1-A for access UEs (e.g., 408) and SSB1-B for backhaul link detection and measurements, while IAB node 406 transmits SSB2-A for access UEs (e.g., 410) and SSB2-B for backhaul link detection and measurements. The SSB1-B and SSB2-B transmitted on off-raster are also TDM with SSB1-A and SSB2-A transmitted on sync raster. While transmitting SSB1-A and SSB1-B, IAB node 404 may also need to listen to SSB2-B for possible backhaul link backup. In some embodiments, SSB1-A and SSB1-B can be overlapped, while SSB1-B and SSB2-B can be overlapped.

Since current NR Rel-15 specifications do not accommodate off-raster SSB, techniques discussed herein can be used for a new design of off-raster SSB.

Off-raster SSB design.

Based on current SSB properties in Rel-15 specifications, the off-raster SSB design can be modified in the following aspects: increase off-raster SSB-B periodicity, increase the maximum number of candidate SSBs in a burst set for off-raster SSB, and SMTC enhancements and signaling enhancement for off-raster SSB.

Design 1: Increase off-raster SSB periodicity.

In some aspects, as the locations of IAB nodes are relatively fixed and IAB nodes can have a higher number of antennas than UEs, the channel between IAB nodes are more stable than the channel between an IAB node and a UE. In some aspects, the SSB periodicity for sync raster may be defined as one of {5, 10, 20, 40, 80, 160} ms. The off-raster SSB periodicity may be increased and maybe, for example, one of {10, 20, 40, 80, 160, 320, 640} ms.

Design 2: Increase the maximum number of candidate SSBs in a burst set for off-raster SSB-B.

In some aspects, the number and first symbol indexes for candidate SSBs may be defined according to the subcarrier spacing and carrier frequency range. For example, for 15 kHz subcarrier spacing, the first symbols of the candidate SSBs have indexes {2,8}+14*n. For carrier frequencies smaller than or equal to 3 GHz, n=0,1. For carrier frequencies large than 3 GHz and smaller than or equal to 6 GHz, n=0,1,2,3.

The maximum number L of SSBs in a burst set may be frequency-dependent and may be set as follows: L=4 for up to 3 GHz; L=8 for 3 GHz to 6 GHz; and L=64 for 6 GHz to 52.6 GHz.

Figure 5:
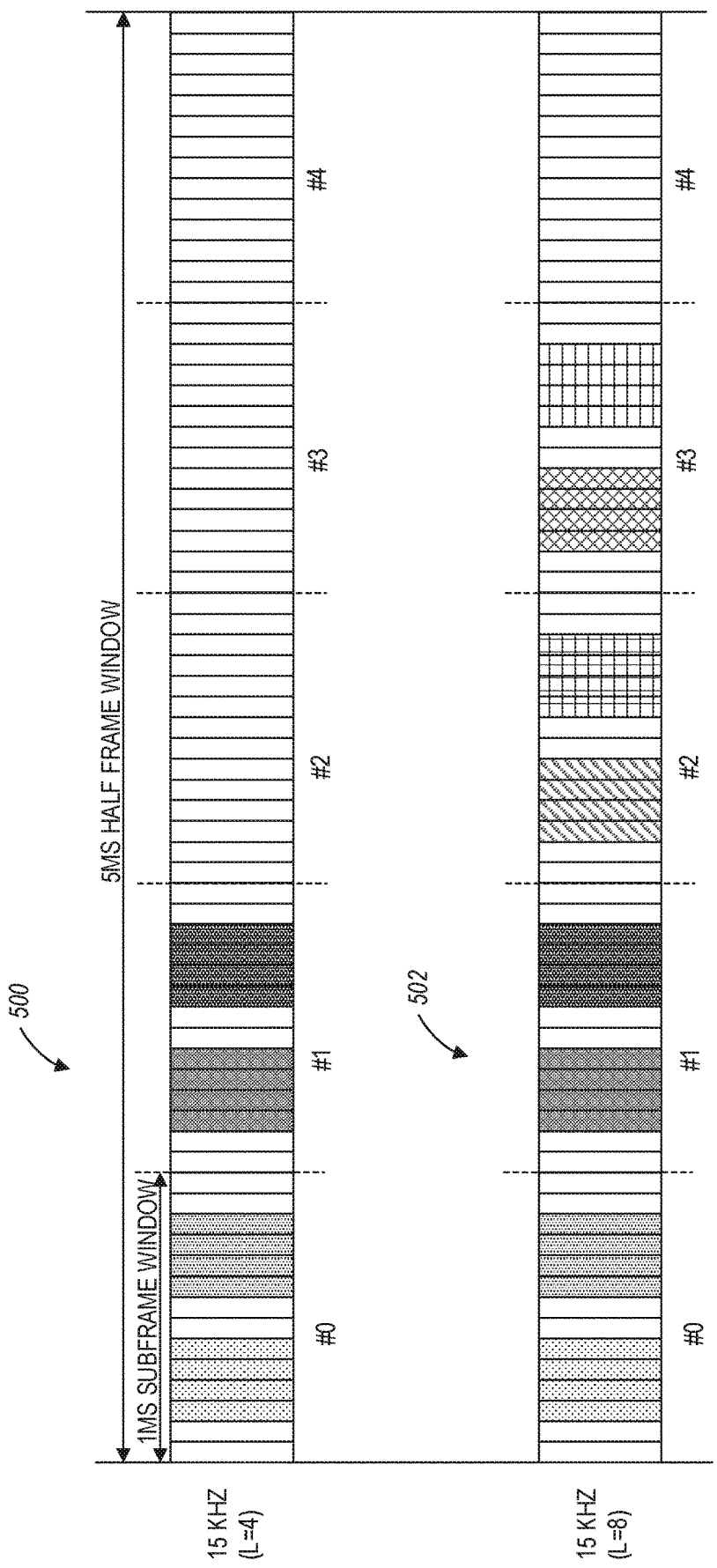
FIG. 5 illustrates example SSB positions within a burst set, in accordance with some aspects.

FIG. 5 illustrates example SSB positions within a burst set, in accordance with some aspects. More specifically, diagram 500 illustrates four candidate SSB locations (e.g., L=4) for 15 kHz subcarrier spacing (e.g., four shaded areas within the first and second 1 ms subframe windows). Diagram 502 illustrates eight candidate SSB locations (e.g., L=8) for 15 kHz subcarrier spacing (e.g., eight shaded areas within the first, second, third, and fourth 1 ms subframe windows).

In some aspects, at each candidate SSB location, one SSB can be transmitted via a specific beam radiated in a certain direction. With the maximum number L=64 for 6 GHz to 52.6 GHz in current NR Rel-15, the maximum number of beams can be used for beam sweeping is 64.

In an IAB network, IAB nodes can be deployed for longer distances with each other compared the distance from an IAB node to an access UE. In addition, the antenna height of an IAB node is higher than access UEs. Hence, more beams will be needed to beam sweep for other IAB nodes. As a result, increasing the maximum number of candidate SSBs in a burst set becomes a new design for off-raster SSB, as illustrated in FIG. 5.

Design 3: SMTC enhancements for off-raster SSB.

SSB based measurement time configuration (SMTC) is the measurement window periodicity/duration/offset information for radio resource management (RRM) per frequency carrier. In current NR Rel-15, the candidate values for SMTC window periodicity are {5,10,20,40,80,160} ms; the candidate values for SMTC window duration are {1,2, 3,4,5} ms for both intra/inter-frequency measurements; for intra-frequency RRC-CONNECTED mode measurement, up to two measurement windows can be configured; and for inter-frequency RRC-CONNECTED mode measurements, only a single SMTC is configured per frequency carrier.

In the IAB network with off-raster SSB (e.g., SSB-B), the SSB periodicity may be increased for off-raster SSB (as discussed hereinabove for Design 1), and possibly more SSB resources are designed for off-raster SSB (as discussed hereinabove for Design 2). Hence, some options for enhancements on SMTC are discussed hereinbelow:

(a) The candidate values for SMTC window periodicity are depending on SSB periodicity on sync raster and off-raster. If the off-raster SSB periodicity is increased and for example as {10, 20, 40, 80, 160, 320, 640} ms, the candidate values for SMTC window periodicity will be {5, 10, 20, 40, 80, 160, 320, 640, 1280} ms.

(b) The candidate values for SMTC window duration may have more entries, depending on the off-raster SSB design to increase the maximum number of candidate SSB locations. If that design increases SS burst set half-frame window limit, for example to SS burst set within 10 ms window, then the candidate values for SMTC window duration are {1, 2, 3, 4, 5, 6, 7, 8, 9, 10} ms for both intra/inter-frequency measurements.

(c) For intra-frequency RRC-CONNECTED mode measurement (e.g., as associated with SSB-A signaling), up to N1 measurement window can be configured, where N1>=3; and (d) For inter-frequency RRC-CONNECTED mode measurements (e.g., as associated with SSB-B signaling), up to N2 SMTC windows can be configured per frequency carrier, where N2>=2. The SMTC window periodicity, the SMTC window duration, the N1, and the N2 parameters can be configured by the IAB donor (e.g., via RRC signaling).

Design 4: Signaling Enhancements for off-raster SSB.

Off-raster SSB in the IAB network will have some impact on current SSB-related signaling discussed in Technical Specification (TS) 38.311, like master information block (MIB) and system information block 1 (SIB1) signaling. As MIB and SIB1 are radio resource control (RRC) signaling and generated at the central unit (CU) in an IAB donor for an IAB node, both sync raster and off-raster SSB information for that IAB node may need to be accommodated. Since the periodicity and/or maximum number of SSB locations may be different for off-raster SSBs, the value ranges of some fields in MIB/SIB1 need to be enhanced for off-raster.

Techniques disclosed herein can be used to address the following two aspects: Aspect 1: The MIB/SIB1 enhancements generated at the CU; and Aspect 2: The transmission of the enhanced MIB/SIB1 from the CU to an IAB node.

Aspect 1: The MIB/SIB1 enhancements generated at the CU.

In a current MIB as shown below, there is one field that contains SSB-rated information: the frequency domain offset between SSB and the overall resource block grid in a number of subcarriers ("ssb-SubcarrierOffset") in the following MIB signaling:

```
MIB ::=                           SEQUENCE {
    systemFrameNumber                 BIT STRING (SIZE (6)),
    subCarrierSpacingCommon           ENUMERATED {scs15or60, scs30or120},
    ssb-SubcarrierOffset              INTEGER (0..15),
    dmrs-TypeA-Position               ENUMERATED {pos2, pos3},
    pdcch-ConfigSIB1                  PDCCH-ConfigSIB1,
    cellBarred                        ENUMERATED {barred, notBarred),
    intraFreqReselection              ENUMERATED {allowed, notAllowed},
    spare                             BIT STRING (SIZE (1))
}
```

In IAB network with off-raster SSB, the MIB generated at the CU needs to accommodate both sync raster and off-raster SSB information. There are two ways to enhance the MIB generated at the CU:

Solution MIB-1: Add a new field in current MIB for off-raster SSB frequency domain offset. One embodiment for this solution can be as follows, where N-offSSBoffset can be set accordingly.

```
MIB ::=                           SEQUENCE {
    systemFrameNumber                 BIT STRING (SIZE (6)),
    subCarrierSpacingCommon           ENUMERATED {scs15or60, scs30or120},
    ssb-SubcarrierOffset              INTEGER (0..15),
    ssb-SubcarrierOffset2             INTEGER (0..N-offSSBoffset)
    dmrs-TypeA-Position               ENUMERATED {pos2, pos3},
    pdcch-ConfigSIB1                  PDCCH-ConfigSIB1,
    cellBarred                        ENUMERATED {barred, notBarred},
    intraFreqReselection              ENUMERATED {allowed, notAllowed},
    spare                             BIT STRING (SIZE (1))
}
```

Solution MIB-2: Generate two sets of MIBs at the CU and transmit to the IAB DU, one for sync raster SSB, another for off-raster SSB. One embodiment for this solution can be as follows: keep MIB as the same structure as in Rel-15 for sync raster, add "MIB-offraster" for off-raster SSB. The following separate MIBs can be used:

```
MIB ::=                           SEQUENCE {
    systemFrameNumber                 BIT STRING (SIZE (6)),
    subCarrierSpacingCommon           ENUMERATED {scs15or60, scs30or120},
    ssb-SubcarrierOffset              INTEGER (0..15),
    dmrs-TypeA-Position               ENUMERATED {pos2, pos3},
    pdcch-ConfigSIB1                  PDCCH-ConfigSIB1,
    cellBarred                        ENUMERATED {barred, notBarred},
    intraFreqReselection              ENUMERATED {allowed, notAllowed},
    spare                             BIT STRING (SIZE (1))
}
MIB-offraster ::=                 SEQUENCE {
    systemFrameNumber                 BIT STRING (SIZE (6)),
    subCarrierSpacingCommon           ENUMERATED {scs15or60, scs30or120},
```

```
    ssb-SubcarrierOffset2              INTEGER (0..N-offSSBoffset)
        dmrs-TypeA-Position                ENUMERATED {pos2, pos3},
        pdcch-ConfigSIB1                   PDCCH-ConfigSIB1,
        cellBarred                         ENUMERATED {barred, notBarred},
        intraFreqReselection               ENUMERATED {allowed,
notAllowed},
        spare                          BIT STRING (SIZE (1))
    }
```

In current system information block 1 (SIB1) as shown below, there are two parameters in one field ("servingCell-ConfigCommon") that contains SSB-rated information: the time domain positions of the transmitted SSB in an SS-burst ("ssb-PositionsInBurst"); and the SSB periodicity in msec ("ssb-PeriodicityServingCell"). The following SIB1 signaling may be used:

```
    SIB1 ::=    SEQUENCE {
          ...
          servingCellConfigCommon            ServingCellConfigCommonSIB
OPTIONAL,
          ...
    }
    ServingCellConfigCommonSIB ::=            SEQUENCE {
        downlinkConfigCommon                  DownlinkConfigCommonSIB,
        uplinkConfigCommon                    UplinkConfigCommonSIB
OPTIONAL,
        supplementaryUplink              UplinkConfigCommonSIB
OPTIONAL,
        n-TimingAdvanceOffset            ENUMERATED {n0,n25560,n39936}
OPTIONAL,
        ssb-PositionsInBurst                  SEQUENCE {
            inOneGroup                        BIT STRING (SIZE (8)),
            groupPresence                     BIT STRING (SIZE (8)) OPTIONAL
        },
        ssb-PeriodicityServingCell            ENUMERATED {ms5, ms10, ms20,
ms40, ms80, ms160},
        tdd-UL-DL-ConfigurationCommon              TDD-UL-DL-ConfigCommon
OPTIONAL,
        ss-PBCH-BlockPower               INTEGER (-60..50),
        ...
    }
```

In the IAB network with offraster SSB, the SIB generated at the CU may accommodate both sync raster and off-raster SSB information. The following three solutions may be used to enhance the SIB1 transmitted to the IAB DU:

Solution SIB1-1: Change the current field servingCell-ConfgCommon in the SIB1 to include additional parameters for off-raster SSB. That is to say, add new fields in the current ServingCellConfigComm SIB information element (IE) for off-raster SSB related information, like time domain positions and periodicity. One embodiment for this solution can be as follows (the off-raster SSB periodicity can be further revised):

```
        SIB1 ::=    SEQUENCE {
              ...
              servingCellConfigCommon            ServingCellConfigCommonSIB
        OPTIONAL,
              ...
        }
        ServingCellConfigCommonSIB ::=            SEQUENCE {
            downlinkConfigCommon                  DownlinkConfigCommonSIB,
            uplinkConfigCommon                    UplinkConfigCommonSIB
        OPTIONAL,
            supplementaryUplink              UplinkConfigCommonSIB
        OPTIONAL,
            n-TimingAdvanceOffset            ENUMERATED {n0,n25560,n39936}
        OPTIONAL,
            ssb-PositionsInBurst                  SEQUENCE {
                inOneGroup                        BIT STRING (SIZE (8)),
                groupPresence                     BIT STRING (SIZE (8)) OPTIONAL
            },
            ssb-PeriodicityServingCell            ENUMERATED {ms5, ms10, ms20,
        ms40, ms80, ms160},
```

```
        ssb-PositionsInBurst2              SEQUENCE {
            inOneGroup                     BIT STRING (SIZE (8)),
            groupPresence                  BIT STRING (SIZE (8)) OPTIONAL
        },
        ssb-PeriodicityServingCell2        ENUMERATED {ms10, ms20,
ms40,ms80,ms160,ms320},
            tdd-UL-DL-ConfigurationCommon          TDD-UL-DL-ConfigCommon
OPTIONAL,
            ss-PBCH-BlockPower             INTEGER (-60..50),
            ...
    }
```

Solution SIB1-2: Add a new field in current SIB1 for off-raster SSB. One embodiment for this solution can be as follows. Without defining a new IE for this "servingCell-ConfigCommon2" field, the range of some fields of current "ServingCellConfigCommonSIB" IE may be enhanced according to off-raster SSB design. The following SIB1 signaling may be used:

```
    SIB1 ::=        SEQUENCE {
        ...
        servingCellConfigCommon       ServingCellConfigCommonSIB
OPTIONAL,
        servingCellConfigCommon2      ServingCellConfigCommonSIB
OPTIONAL,
        ...
    }
```

Solution SIB1-3: Generate two sets of SIB1s at the CU, one for sync raster SSB, another for off-raster SSB. One embodiment for this solution can be as follows: keep SIB1 as the same structure as in Rel-15 for sync raster, add "SIB1-offraster" for off-raster SSB. The following SIB1 signaling may be used:

```
    SIB1 ::=        SEQUENCE {
        ...
        servingCellConfigCommon       ServingCellConfigCommonSIB
OPTIONAL,
        ...
    }
    SIB1-offraster ::=    SEQUENCE {
        ...
        servingCellConfigCommon2      ServingCellConfigCommonSIB
OPTIONAL,
        ...
    }
```

Aspect 2: The transmission of the enhanced MIB/SIB1 from the CU to an IAB node.

In current TAB network architectures, central unit (CU)/distributed unit (DU) split has been leveraged where each IAB node holds a DU and a Mobile-Termination (MT) function: via the MT function, the TAB node connects to its parent IAB node or the IAB-donor like a UE; via the DU function, the TAB node communicates with UEs and MTs of child TAB nodes like a base station. Signaling between the MTs on an JAB node or UEs and the CU on the TAB donor uses RRC protocol, while signaling between DU on an TAB node and the CU on the TAB donor uses F1-AP protocol, as shown in FIG. 3.

Hence, after the CU generated the enhanced MIB/SIB1 related to both sync raster and off-raster SSB information, there are two ways for CU to inform transmission schemes of the enhanced MIB/SIB1 to DU: either from CU to the IAB node through F1AP container or F1-AP message, or through RRC signaling. Additional information regarding the two solutions follows hereinbelow.

Solution 2-1: Transmit through CU to TAB DU through the F1-AP link.

There are two alternatives to this solution.

Alternative 1: The CU generates an RRC message including MIB/SIB1. The RRC message is then encapsulated in F1-AP container. The DU decodes the RRC message from the F1-AP container and transmits MIB/SIB through physical channels following the transmission configuration as defined in the enhanced MIB/SIB. This alternative may use the DU decoding the RRC message encapsulated in an F1-AP container.

Alternative 2: The CU generates an RRC message including MIB/SIB1. The RRC message is then encapsulated in an F1-AP container. In addition, the CU may generate another F1-AP message carrying an indication of the transmission schemes (frequency location, periodicity, beam index) that the DU should use to transmit the enhanced MIB/SIB1. The DU may only decode the F1-AP message carrying the transmission scheme but may not decode the F1-AP container that carries the MIB/SIB1 RRC message.

To carry the MIB/SIB1 information needed for Aspects 2 in F1-AP signaling, the following three options for F1-AP protocol extension may be used:

Option 1: Enhancement of the existing GNB-CU CONFIGURATION UPDATE F1-AP message may be used for carrying the MIB/SIB1 information.

Option 2: Enhancement of the existing SYSTEM INFORMATION DELIVERY COMMAND F1-AP message may be used for carrying the MIB/SIB1 information.

Option 3: A new dedicated F1-AP message may be used for carrying the MIB/SIB1 information.

Solution 2-2: Transmit the MIB/SIB1 information through CU to IAB MT through RRC signaling. In this solution, the enhanced MIB/SIB1 related to both sync raster and off-raster SSB information are transmitted from the CU of IAB donor to the MT of an IAB node through RRC signaling.

In some aspects, the SSB-B transmissions, as well as the SSB-B parameters, are not limited to off-raster transmissions and other types of frequency resources may be used.

Figure 6:
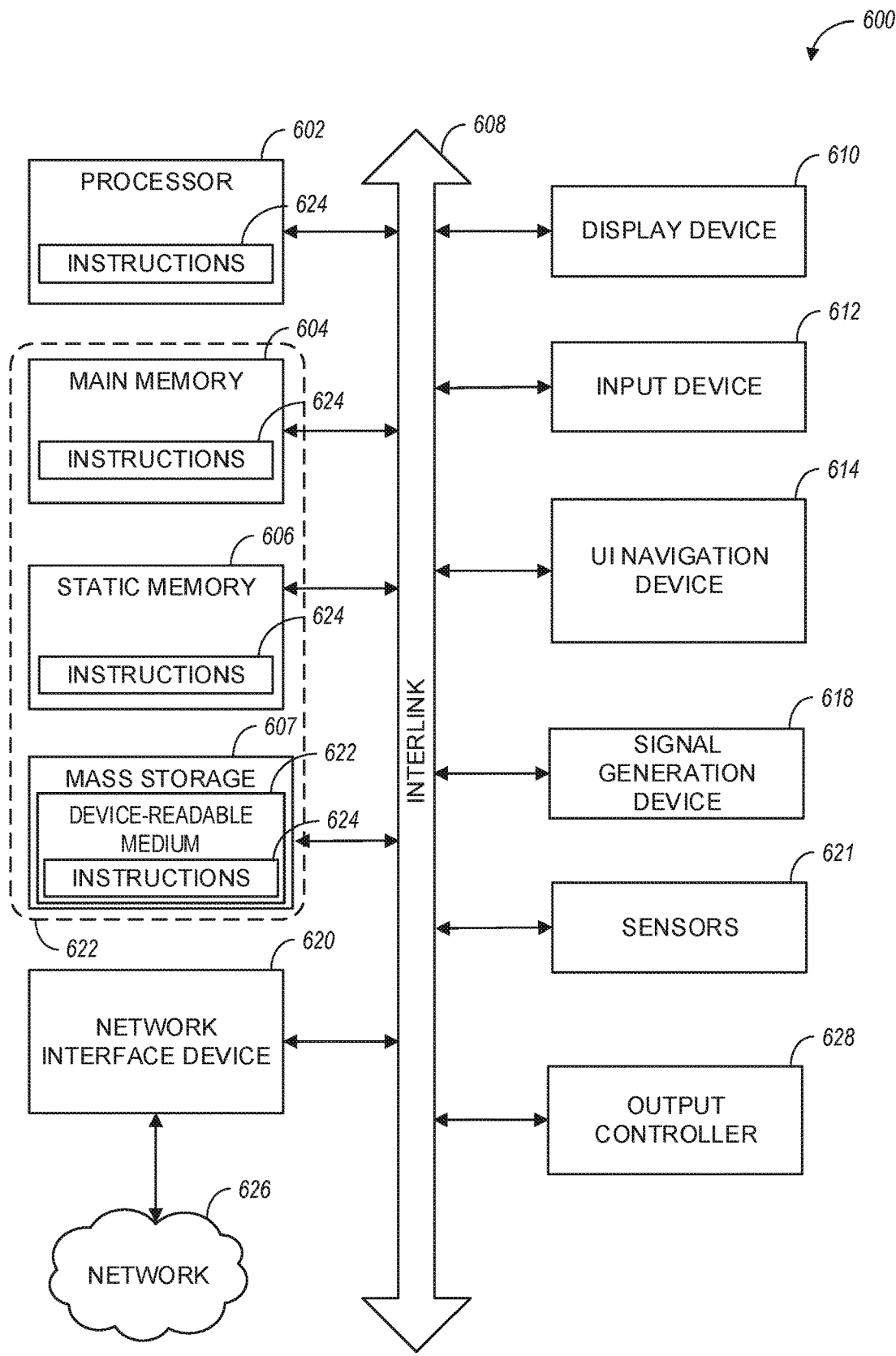
FIG. 6 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 6 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 600 may operate as a standalone device or may be connected (e.g., networked) to other communication devices.

Circuitry (e.g., processing circuitry) is a collection of circuits implemented in tangible entities of the device 600 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 600 follow.

In some aspects, the device 600 may operate as a stand-alone device or may be connected (e.g., networked) to other devices. In a networked deployment, the communication device 600 may operate in the capacity of a server communication device, a client communication device, or both in server-client network environments. In an example, the communication device 600 may act as a peer communication device in peer-to-peer (P2P) (or other distributed) network environment. The communication device 600 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 600 may include a hardware processor 602 (e.g., a central processing unit (CPU), a graphics processing unit (GPU), a hardware processor core, or any combination thereof), a main memory 604, a static memory 606, and mass storage 607 (e.g., hard drive, tape drive, flash storage, or other block or storage devices), some or all of which may communicate with each other via an interlink (e.g., bus) 608.

The communication device 600 may further include a display device 610, an alphanumeric input device 612 (e.g., a keyboard), and a user interface (UI) navigation device 614 (e.g., a mouse). In an example, the display device 610, input device 612 and UI navigation device 614 may be a touch-screen display. The communication device 600 may additionally include a signal generation device 618 (e.g., a speaker), a network interface device 620, and one or more sensors 621, such as a global positioning system (GPS) sensor, compass, accelerometer, or another sensor. The communication device 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 607 may include a communication device-readable medium 622, on which is stored one or more sets of data structures or instructions 624 (e.g., software) embodying or utilized by any one or more of the techniques or functions described herein. In some aspects, registers of the processor 602, the main memory 604, the static memory 606, and/or the mass storage 607 may be, or include (completely or at least partially), the device-readable medium 622, on which is stored the one or more sets of data structures or instructions 624, embodying or utilized by any one or more of the techniques or functions described herein. In an example, one or any combination of the hardware processor 602, the main memory 604, the static memory 606, or the mass storage 616 may constitute the device-readable medium 622.

As used herein, the term "device-readable medium" is interchangeable with "computer-readable medium" or "machine-readable medium". While the communication device-readable medium 622 is illustrated as a single medium, the term "communication device-readable medium" may include a single medium or multiple media (e.g., a centralized or distributed database, and/or associated caches and servers) configured to store the one or more instructions 624. The term "communication device-readable medium" is inclusive of the terms "machine-readable medium" or "computer-readable medium", and may include any medium that is capable of storing, encoding, or carrying instructions (e.g., instructions 624) for execution by the communication device 600 and that cause the communication device 600 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 624 may further be transmitted or received over a communications network 626 using a transmission medium via the network interface device 620 utilizing any one of a number of transfer protocols. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input-multiple-output (SIMO), MIMO, or multiple-input-single-output (MISO) techniques. In some examples, the network interface device 620 may wirelessly communicate using Multiple User MIMO techniques.

The term "transmission medium" shall be taken to include any intangible medium that is capable of storing, encoding or carrying instructions for execution by the communication device 600, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus of an Integrated Access and Backhaul (IAB) node, the apparatus comprising:
   processing circuitry, wherein to configure the IAB node for inter-IAB node discovery and measurements within an IAB network, the processing circuitry is to:
      encode a first synchronization signal block (SSB-A) for transmission to an access UE using a first frequency resource from a synchronization raster set of frequency resources;
      encode a second SSB (SSB-B) for transmission to a second IAB node using a second frequency resource from an off-raster set of frequency resources, the off-raster set being non-overlapping with the synchronization raster set of frequency resources and the SSB-B being time-division multiplexed with the SSB-A;
      decode master information block (MIB) signaling or system information block 1 (SIB1) signaling from an IAB donor, the MIB or SIB1 signaling including configuration parameters for the SSB-B, wherein the configuration parameters for the SSB-B include one or more of an SSB-B periodicity, an SSB-B subcarrier offset, and an SSB-B position in a burst set; and
      decode a measurement report from the second IAB node, the measurement report based on the SSB-B and associated with a backhaul link between the IAB node and the second IAB node; and
   memory coupled to the processing circuitry and configured to store the SSB-A and the SSB-B.

2. The apparatus of claim 1, wherein the processing circuitry is to encode the SSB-A for transmission to the access UE in connection with initial access to the IAB network.

3. The apparatus of claim 1, wherein the processing circuitry is to:
   determine a link condition associated with the backhaul link based on the measurement report; and
   encode another SSB-B for transmission within the IAB network in connection with a link switch, based on the determined link condition.

4. The apparatus of claim 1, wherein the processing circuitry is to:
   decode another SSB-B received from a third IAB node via a second backhaul link;
   perform synchronization signal measurements within an SSB-based measurement time configuration (SMTC) window based on the another SSB-B; and
   determine there is a link failure on the second backhaul link based on the synchronization signal measurements.

5. The apparatus of claim 4, wherein the processing circuitry is to:
   decode radio resource control (RRC) signaling from the IAB donor, the RRC signaling including configuration information to configure an SMTC periodicity and an SMTC duration for the SMTC window.

6. The apparatus of claim 5, wherein the SMTC periodicity is one of the following periodicities: 5 ms, 10 ms, 20 ms, 40 ms, 80 ms, 160 ms, 320 ms, 640 ms, and 1280 ms.

7. The apparatus of claim 5, wherein the SMTC duration is one of the following durations: 1 ms, 2 ms, 3 ms, 4 ms, 5 ms, 6 ms, 7 ms, 8 ms, 9 ms, and 10 ms.

8. The apparatus of claim 1, wherein the processing circuitry is to:
   decode radio resource control (RRC) signaling from the IAB donor, the RRC signaling including configuration information to configure SSB periodicity for the synchronization raster set of frequency resources and SSB periodicity for the off-raster set of frequency resources.

9. The apparatus of claim 8, wherein the SSB periodicity for the synchronization raster set of frequency resources is one of the following periodicities: 5 ms, 10 ms, 20 ms, 40 ms, 80 ms, and 160 ms.

10. The apparatus of claim 8, wherein the SSB periodicity for the off-raster set of frequency resources is one of the following periodicities: 5 ms, 10 ms, 20 ms, 40 ms, 80 ms, 160 ms, 320 ms, and 640 ms.

11. The apparatus of claim 1, wherein the MIB signaling or the SIB 1 signaling is received from the IAB donor via radio resource control (RRC) signaling or via F1-AP signaling.

12. The apparatus of claim 1, further comprising transceiver circuitry coupled to the processing circuitry; and, one or more antennas coupled to the transceiver circuitry.

13. An apparatus of an Integrated Access and Backhaul (IAB) node, the apparatus comprising:
  processing circuitry, wherein to configure the IAB node for inter-IAB node discovery and measurements within an IAB network, the processing circuitry is to:
    decode master information block (MIB) signaling or system information block 1 (SIB1) signaling from an IAB donor, the MIB or SIB1 signaling including configuration parameters for a synchronization signal block for the inter-IAB node discovery and measurements (SSB-B), wherein the configuration parameters for the SSB-B include one or more of an SSB-B periodicity, an SSB-B sub-carrier offset, and an SSB-B position in a burst set;
    encode the SSB-B for transmission to a second IAB node using a frequency resource from an off-raster set of frequency resources, the off-raster set being non-overlapping with a synchronization raster set of frequency resources for initial access, and the SSB-B being time-division multiplexed with an SSB transmitted using the synchronization raster set (SSB-A); and
    decode a measurement report from the second IAB node, the measurement report based on the SSB-B and associated with a backhaul link between the IAB node and the second IAB node; and
  memory coupled to the processing circuitry and configured to store the SSB-B.

14. The apparatus of claim 13, wherein the configuration parameters include SSB periodicity for the off-raster set of frequency resources; and
  wherein the SSB periodicity for the off-raster set of frequency resources is one of the following periodicities: 5 ms, 10 ms, 20 ms, 40 ms, 80 ms, 160 ms, 320 ms, and 640 ms.

15. The apparatus of claim 13, wherein the processing circuitry is to encode the SSB-A for transmission to the access UE in connection with initial access to the IAB network.

16. The apparatus of claim 13, wherein the processing circuitry is to:
  determine a link condition associated with the backhaul link based on the measurement report; and
  encode another SSB-B for transmission within the IAB network in connection with a link switch, based on the determined link condition.

17. The apparatus of claim 13,
  wherein the MIB signaling or the SIB1 signaling is received from the IAB donor via radio resource control (RRC) signaling or via F1-AP signaling.

18. A non-transitory computer-readable storage medium that stores instructions for execution by one or more processors of an Integrated Access and Backhaul (IAB) node, the instructions to configure the IAB node for inter-IAB node discovery and measurements within an IAB network, and to cause the IAB node to:
  decode master information block (MIB) signaling or system information block 1 (SIB1) signaling from an IAB donor, the MIB or SIB1 signaling including configuration parameters for a synchronization signal block for the inter-IAB node discovery and measurements (SSB-B), wherein the configuration parameters for the SSB-B include one or more of an SSB-B periodicity, an SSB-B sub-carrier offset, and an SSB-B position in a burst set;
  encode the SSB-B for transmission to a second IAB node using a frequency resource from an off-raster set of frequency resources, the off-raster set being non overlapping with a synchronization raster set of frequency resources for initial access, and the SSB-B being time-division multiplexed with an SSB transmitted using the synchronization raster set (SSB-A); and
  decode a measurement report from the second IAB node, the measurement report based on the SSB-B and associated with a backhaul link between the IAB node and the second IAB node.

19. The non-transitory computer-readable storage medium of claim 18, wherein the SSB-B periodicity for the off-raster set of frequency resources is one of the following periodicities: 5 ms, 10 ms, 20 ms, 40 ms, 80 ms, 160 ms, 320 ms, and 640 ms.

20. The non-transitory computer-readable storage medium of claim 18, wherein the MIB signaling or the SIB1 signaling is received from the IAB donor via radio resource control (RRC) signaling or via F1-AP signaling.

* * * * *